UNITED STATES PATENT OFFICE.

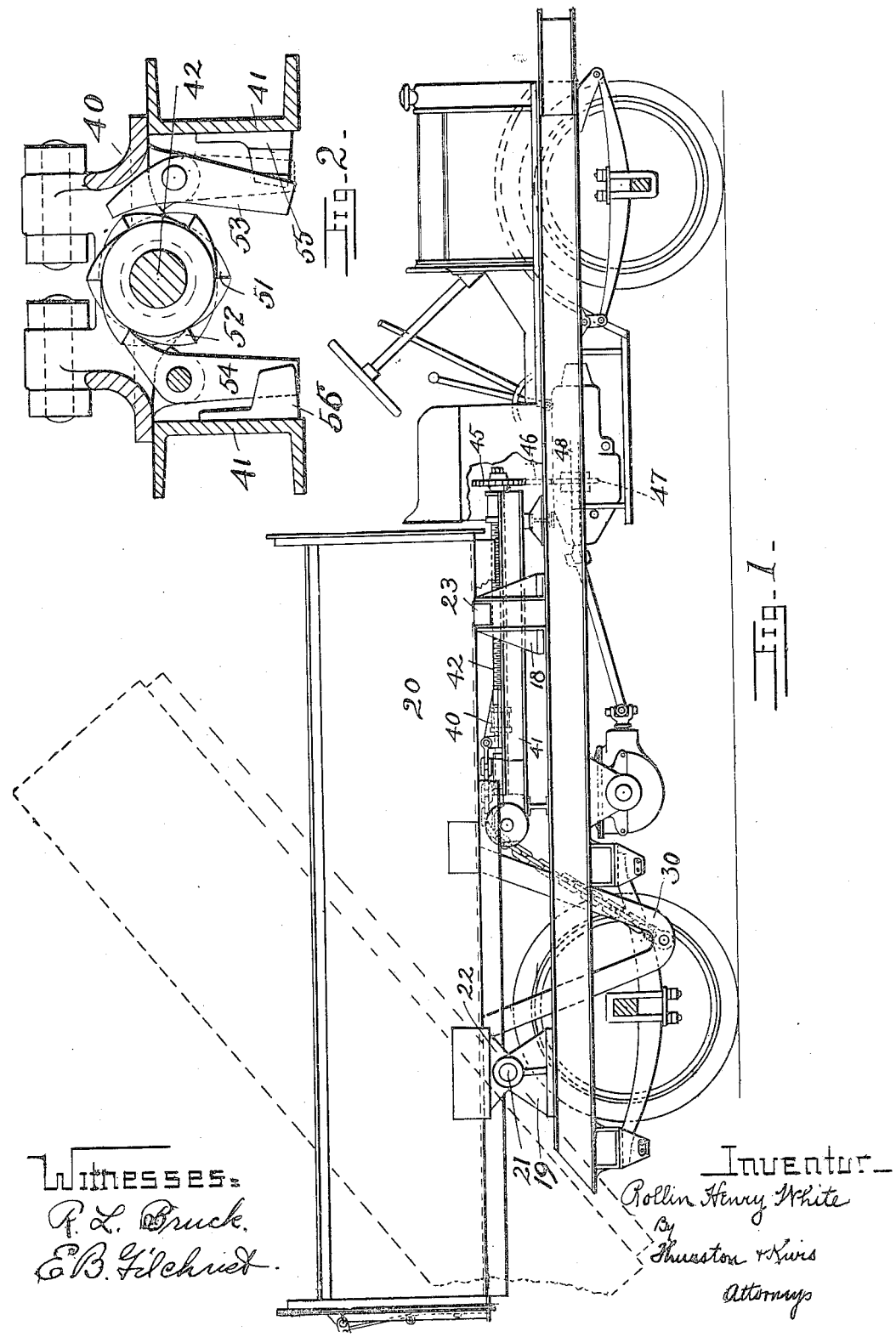

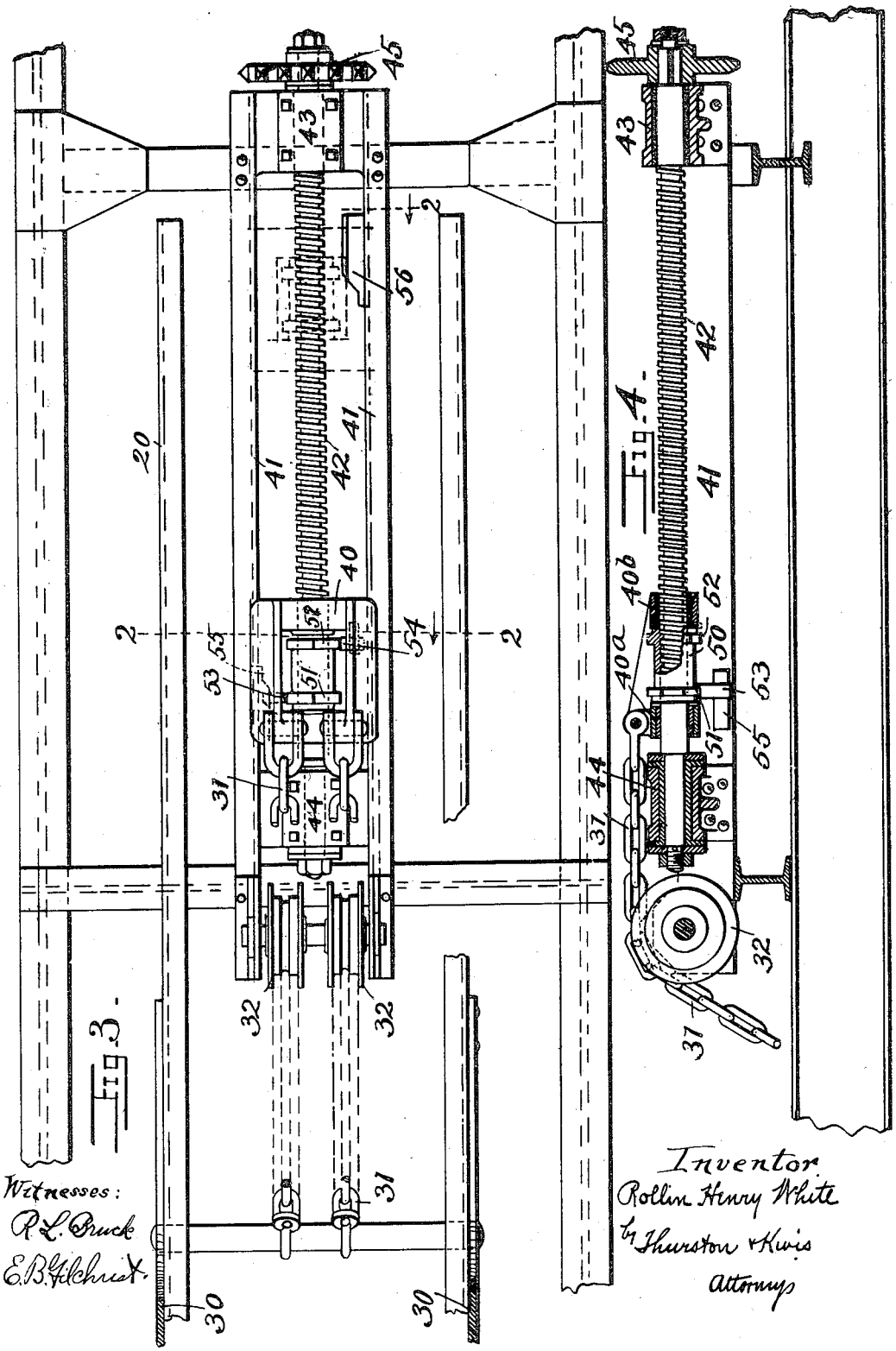

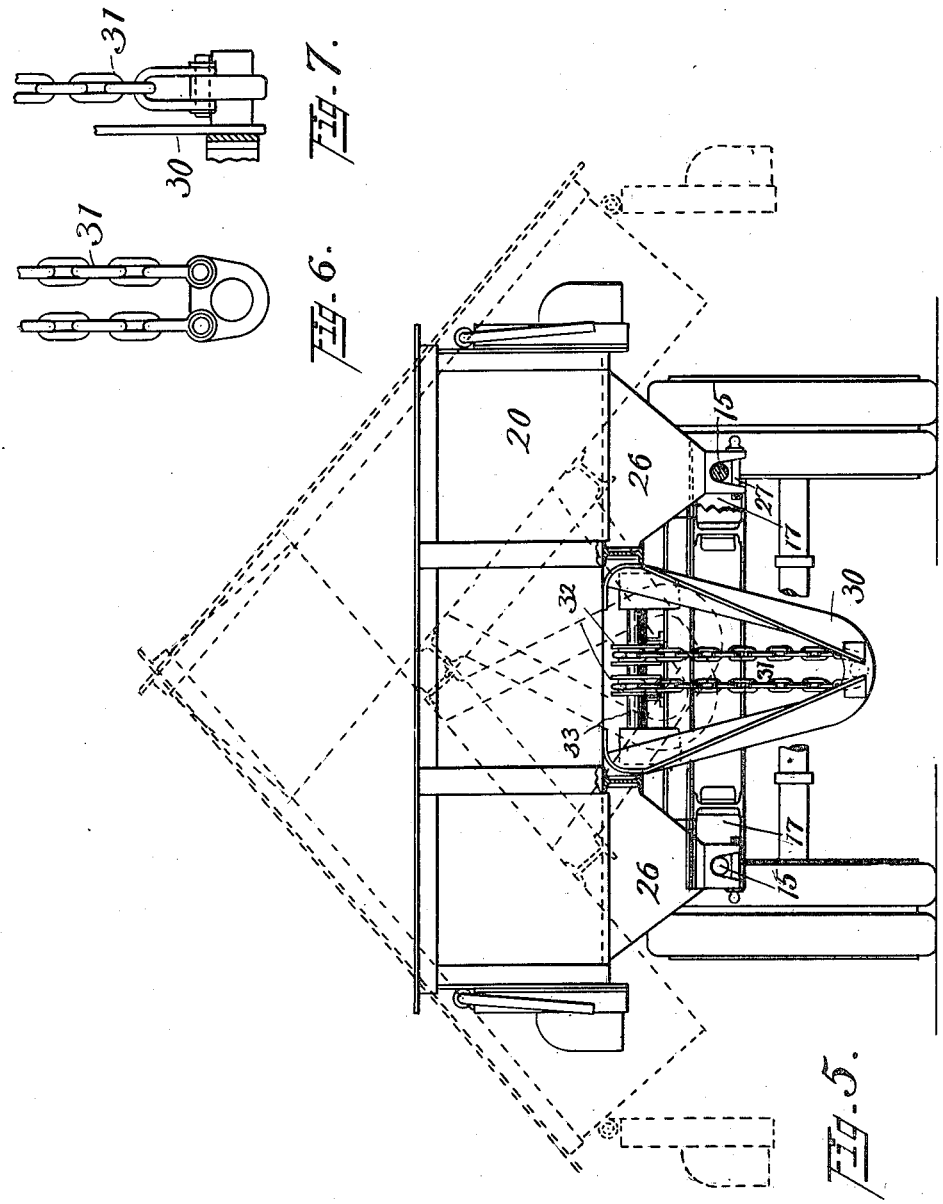

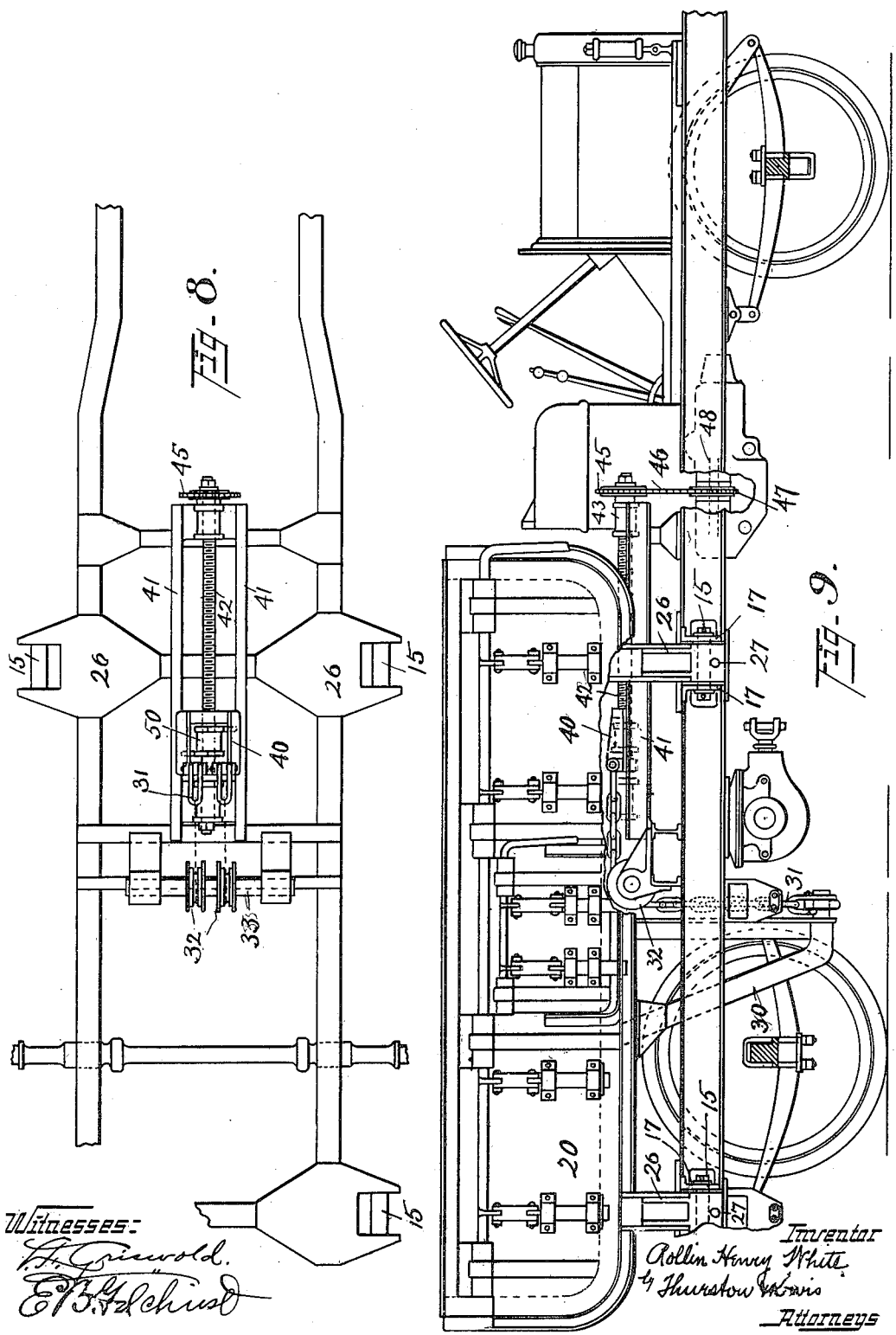

ROLLIN HENRY WHITE, OF CLEVELAND HEIGHTS, OHIO, ASSIGNOR TO THE WHITE COMPANY, OF CLEVELAND, OHIO, A CORPORATION OF OHIO.

DUMPING-TRUCK.

1,069,749.  Specification of Letters Patent.  Patented Aug. 12, 1913.

Application filed October 19, 1912. Serial No. 726,613.

*To all whom it may concern:*

Be it known that I, ROLLIN H. WHITE, a citizen of the United States, residing at Cleveland Heights village, in the county of Cuyahoga and State of Ohio, have invented a certain new and useful Improvement in Dumping-Trucks, of which the following is a full, clear, and exact description.

This invention relates to improvements in mechanism for tilting the tiltable body of a dumping wagon or car. It is particularly contrived with reference to use for tilting the tiltable body which is a part of a motor driven vehicle, and is arranged so that the mechanism for tilting the body can be operated by power supplied by the motor which is primarily provided for propelling the vehicle.

One object of the invention is to provide suitable mechanism for this purpose adapted to be driven by said motor, but so constructed that no damage will be done to it or the vehicle, or any part thereof, even if the operator shall neglect to disconnect the motor from the operating mechanism when the body has been tilted as far as it is intended to tilt it.

In the drawing, Figure 1 is a side elevation of a rear dumping motor truck. Fig. 2 is a transverse sectional view in the plane indicated by line 2—2 on Fig. 3. Fig. 3 is a plan view which shows the mechanism for causing the tilting of the tiltable body. Fig. 4 is a sectional side elevation of the mechanism shown in Fig. 3. Fig. 5 is a rear end view of a side dumping motor vehicle embodying the invention. Figs. 6 and 7 are respectively a rear view and a side elevation of the lower end of the chain which connects the depending arm which is fixed to the tiltable body with the longitudinally movable carriage. Fig. 8 is a plan view of the body tilting mechanism in the form which is especially adapted for use with the side dumping body. Fig. 9 is a side elevation of a side dumping motor truck embodying the invention.

The drawings show a motor vehicle which is generally of conventional construction in so far as concerns the disposition of the motor and the means whereby power may be transmitted therefrom at various speeds to the driving wheels.

20 represents the tiltable body or box. As shown in Fig. 1, this has a transverse pivotal connection with the vehicle frame by means of the shaft 21 whose axis is located behind the center of gravity of said box or body. This shaft goes through and pivotally connects brackets 22 fixed to the body, and other brackets 19 which are fixed to the vehicle frame. In this construction the front end of the body will be normally supported, because a part 23 projecting down from the body rests on brackets 18 fixed to the vehicle frame.

In the construction shown in Figs. 5, 8 and 9, the body is constructed and connected with the vehicle frame in such way that it may be tilted sidewise to either right or left; and this because there are two pivotal connections between the body and the vehicle frame located respectively on opposite sides of the longitudinal center of the body and extending forward and backward. In the particular construction shown, two forked brackets 26 are secured to and project down from the body on each side thereof—one near the front and one near the rear end thereof. Each of these forks normally straddles a pivot pin 15 of cylindrical form which is fixed to a bracket 17. These brackets are fixed to the vehicle frame. A retaining pin 27 may be passed beneath each pivot pin 15, and through both legs of the associated forked bracket 26, and thereby each bracket is held in engagement with its associated pivot pin. If the retaining pins 27 on one side are taken out, the body may turn upon the pivot pins on the other side, if power is applied to lift the body.

Secured to and projecting downward from the body and located about midway between the ends and sides thereof is a strong arm 30. To this arm is connected two chains 31, which run over idler sheaves 32 mounted on the vehicle frame, and are connected to a longitudinally movable carriage 40 which is slidable lengthwise of the vehicle upon two guides or track bars 41 which are fixed to the vehicle frame. A feed screw 42 is mounted in suitable bearings 43, 44 between these two track bars; and on the front end of this feed screw is secured some means by which the screw may be turned. Preferably this is a sprocket wheel 45; and, in that event, a sprocket chain 46 running over this wheel will likewise run over another sprocket wheel 47 secured to a rotatable shaft 48 which is a part of the transmission mechanism, or is adapted to be rotated by the vehicle motor.

The screw 42 passes loosely through the end members 40ª, 40ᵇ of the carriage 40, and is freely rotatable therein. A nut 50 is fitted upon this feed screw and lies between two end members of the carriage, so as to be incapable of endwise movement relative to said carriage. Two ratchet wheels 51, 52, are formed on or rigidly secured to this nut, these ratchet wheels having their teeth turned in opposite directions. Two pawls 53, 54, are pivoted to the sliding carriage 40, and they are so placed that one will engage with one of these ratchet wheels, and the other will engage with the other ratchet wheel. These pawls are gravity pawls, and are so hung that they will automatically engage with the ratchets, as stated, unless positively withdrawn from such engagement. If, now, the screw be turned to the left, for example, the nut will tend to turn in the same direction, but will be prevented from turning by the engagement of pawl 54 with ratchet 52, and therefore the nut will, of necessity, travel forward on the screw, and it will cause a like movement of the carriage 40 which will pull up on the chains 31 and thereby cause the body to be lifted. The result will, of course, be the tilting of the body about the fulcrum which connects it with the vehicle frame. Secured to one of the track bars 41 in such position that the depending end of pawl 54 will engage with it, and be rocked so as to withdraw it from engagement with the ratchet 52, is a beveled bracket plate 56. When the nut and the carriage to which the pawl is connected have been moved forward as far as they must be to properly tilt the body, this pawl will engage with this bracket plate, and will be withdrawn from engagement with the ratchet. If, now, the screw be still turned in the same direction, the nut will turn with it, and therefore there will be no further forward movement of the nut or the carriage. This turning of the nut to the left is permitted by the pawl 53 which simply rides idly against the ratchet 51. If, now, the screw be turned in the contrary direction, the pawl 53, by engaging with the ratchet 51, will prevent the nut from turning in the same direction as the screw, and therefore the nut will move rearward on the screw, and the carriage will go with it. This will permit the tilted body to resume its normal position. When the frame has moved backward far enough, the pawl 53 will engage with another beveled trip plate 55 fixed to the side bar 41, and thereby said pawl will be withdrawn from the ratchet so that if the screw be still turned the nut will turn with it in the carriage 40 without causing any longitudinal movement thereof. It is not therefore at all necessary that an operator be careful to disconnect the body tilting mechanism from the motor when the body has been tilted far enough, to insure against breakage or injury.

The foregoing description of the mode of operation of the described construction is applicable to the side dumping construction, as well as to the rear dumping construction. But in the side dumping construction it is necessary that the guide sheaves 32 shall be capable of freely moving to right or left as the body is being tilted, depending upon the direction in which it is tilted. Therefore, as shown in Fig. 8, these sheaves 32 are capable of freely moving endwise on the shaft 33 in either direction from their normal positions and far enough to permit the chains to run smoothly over them.

Having described my invention, I claim:

1. In a dumping truck, the combination of a tiltable body, a sliding carriage, mechanism intermediate of the body and carriage whereby the movement of the latter tilts the former, a rotatable feed screw, a nut thereon which engages said carriage whereby these two must move together lengthwise of the feed screw, a ratchet fixed to said nut, and a pawl mounted on the carriage for engagement with said ratchet, and means for automatically withdrawing the pawl from said ratchet when the carriage has traveled the required distance.

2. In a dumping truck, the combination with the tiltable body having a depending arm, a sliding carriage, a guide sheave, and a flexible device which runs over said guide sheave and connects said carriage and depending arm, of a rotatable feed screw, a nut thereon which engages said sliding carriage whereby the nut and carriage must move together lengthwise of the feed screw, and means to prevent or permit the turning of the nut with the feed screw as desired.

3. In a dumping truck, the combination with the tiltable body having a depending arm, a sliding carriage, a guide sheave, and a flexible device which runs over said guide sheave and connects said carriage and depending arm, of a rotatable feed screw, a nut thereon which engages said sliding carriage whereby the nut and carriage must move together lengthwise of the feed screw, a ratchet wheel fixed to said nut, and a pawl mounted on the carriage for engagement with said ratchet.

4. In a dumping truck, the combination with the tiltable body having a depending arm, a sliding carriage, a guide sheave, and a flexible device which runs over said guide sheave and connects said carriage and depending arm, of a rotatable feed screw, a nut thereon which engages said sliding carriage whereby the nut and carriage must move together lengthwise of the feed screw, a ratchet wheel fixed to said nut, a pawl mounted on the carriage for engagement with said ratchet, and means adapted to engage said pawl when the nut has traveled the required distance and to automatically withdraw the pawl from engagement with the ratchet.

5. In a dumping truck, the combination with the tiltable body having a depending arm, a sliding carriage, a guide sheave, and a flexible device which runs over said guide sheave and connects said carriage and depending arm, of a rotatable feed screw, a nut thereon which engages said sliding carriage whereby the nut and carriage must move together lengthwise of the feed screw, two ratchets fixed to said nut and having their teeth turned in opposite directions, two pawls mounted on the carriage and adapted to engage respectively with said ratchets.

6. In a dumping truck, the combination with the tiltable body having a depending arm, a sliding carriage, a guide sheave, and a flexible device which runs over said guide sheave and connects said carriage and depending arm, of a rotatable feed screw, a nut thereon which engages said sliding carriage whereby the nut and carriage must move together lengthwise of the feed screw, two ratchets fixed to said nut and having their teeth turned in opposite directions, two pawls mounted on the carriage and adapted to engage respectively with said ratchets, two devices adapted to respectively engage said pawls when the nut has moved the required distance in either direction and to automatically withdraw the pawls from engagement with the ratchets.

7. In a dumping truck, the combination of a tiltable body having a depending arm, of a sliding carriage having substantially parallel end members, a guide sheave, a flexible device which runs over said guide sheave and connects said carriage and depending arm, a rotatable feed screw which passes freely through the two end members of the carriage, a nut on the feed screw which lies between and in substantial contact with the end members of said carriage, a ratchet fixed to said nut, and a pawl mounted on the carriage for engagement with said nut.

8. In a dumping truck, the combination of a tiltable body having a depending arm, of a sliding carriage having substantially parallel end members, a guide sheave, a flexible device which runs over said guide sheave and connects said carriage and depending arm, a rotatable feed screw which passes freely through the two end members of the carriage, a nut on the feed screw which lies between and in substantial contact with the end members of said carriage, a ratchet fixed to said nut, a pawl mounted on the carriage for engagement with said nut, and means which automatically withdraws the pawl from engagement with the ratchet when the carriage has moved the required distance.

9. In a motor driven dumping truck, the combination with the tiltable body having a depending arm, a guide sheave, a sliding carriage, a device which runs over said guide sheave and is connected with said sliding carriage and depending arm, a rotatable shaft, mechanism for connecting this shaft with the motor for driving the truck, means whereby the rotation of said shaft causes the movement of said carriage, and means for automatically breaking the operative connection between said rotatable shaft and sliding carriage when the latter has moved a predetermined distance.

10. In a dumping truck, the combination of a body having two longitudinally extended pivotal connections with the truck frame, means for rendering either connection inoperative so as to permit either side of the body to be lifted, a depending arm fixed to said body, a sliding carriage, a guide sheave, a flexible device which runs over said guide sheave and is connected with the carriage and depending arm, and power driven means adapted to move said carriage lengthwise of the vehicle.

11. In a dumping truck, the combination with a body having on each side, two alined depending forks, a fixed pivot pin associated with each fork and with which said fork engages, means connecting the two lower ends of each of said forks so as to prevent the same from being lifted from the associated pivot pin, an arm fixed to and extending down from said body, a guide sheave which is rotatably mounted so as to be free to move endwise, a sliding carriage, a flexible device which runs over said guide sheave and is connected with the sliding carriage and depending arm, and means for moving said carriage lengthwise of the vehicle.

In testimony whereof, I hereunto affix my signature in the presence of two witnesses.

ROLLIN HENRY WHITE.

Witnesses:
E. L. THURSTON,
A. J. HUDSON.